United States Patent
Liu

(10) Patent No.: US 12,541,978 B2
(45) Date of Patent: Feb. 3, 2026

(54) METHOD AND DEVICE FOR DETECTING OBSTACLES, AND COMPUTER STORAGE MEDIUM

(71) Applicant: BOE Technology Group Co., Ltd., Beijing (CN)

(72) Inventor: Tong Liu, Beijing (CN)

(73) Assignee: Beijing BOE Technology Development Co., Ltd., Beijing (CN)

(*) Notice: Subject to any disclaimer, the term of this patent is extended or adjusted under 35 U.S.C. 154(b) by 0 days.

(21) Appl. No.: 17/642,003

(22) PCT Filed: Mar. 24, 2021

(86) PCT No.: PCT/CN2021/082778
§ 371 (c)(1),
(2) Date: Sep. 29, 2022

(87) PCT Pub. No.: WO2022/198507
PCT Pub. Date: Sep. 29, 2022

(65) Prior Publication Data
US 2024/0046647 A1    Feb. 8, 2024

(51) Int. Cl.
*G06V 20/52* (2022.01)
*G06T 7/73* (2017.01)
(Continued)

(52) U.S. Cl.
CPC .............. *G06V 20/52* (2022.01); *G06T 7/73* (2017.01); *G06V 10/273* (2022.01); *G06V 10/28* (2022.01);
(Continued)

(58) Field of Classification Search
CPC . G06T 7/70–77; G06T 2207/10016–21; G06T 2207/20224;
(Continued)

(56) References Cited

U.S. PATENT DOCUMENTS

| | | | |
|---|---|---|---|
| 11,893,795 B2* | 2/2024 | Finlayson | G08B 3/10 |
| 2017/0151943 A1* | 6/2017 | Goto | B60W 30/09 |
| 2018/0047193 A1* | 2/2018 | Gao | G06T 7/248 |

FOREIGN PATENT DOCUMENTS

| | | |
|---|---|---|
| CN | 110246122 A | 9/2019 |
| CN | 110766915 A | 2/2020 |

(Continued)

OTHER PUBLICATIONS

Ghadiri et al., From superpixel to human shape modelling for carried object detection (Year: 2018).*

(Continued)

*Primary Examiner* — Oneal R Mistry
*Assistant Examiner* — Jongbong Nah
(74) *Attorney, Agent, or Firm* — IPro, PLLC

(57) ABSTRACT

A method for detecting obstacles includes: acquiring a monitored image of a monitored region, performing object detection on the monitored image, performing pedestrian detection on the monitored image, in response to acquiring an object identification group comprising at least one object identification box by the object detection, and acquiring at least one pedestrian identification box by the pedestrian detection, acquiring a to-be-determined object identification group by removing an object identification box in the object identification group associated with the at least one pedestrian identification box, wherein the object identification box comprises an image of an object in the monitored image, and the pedestrian identification box comprises an image of a pedestrian in the monitored image, and in response to determining that an object identification box is present in the to-be-determined object identification group, determining that an obstacle is present in the monitored region.

17 Claims, 13 Drawing Sheets

(51) Int. Cl.
*G06V 10/26* (2022.01)
*G06V 10/28* (2022.01)
*G06V 10/44* (2022.01)
*G06V 10/75* (2022.01)
*G06V 40/10* (2022.01)

(52) U.S. Cl.
CPC .......... *G06V 10/457* (2022.01); *G06V 10/751* (2022.01); *G06V 40/10* (2022.01); *G06T 2207/10016* (2013.01); *G06T 2207/30232* (2013.01); *G06V 2201/07* (2022.01)

(58) Field of Classification Search
CPC ............... G06T 2207/30196–30201; G06T 2207/30232; G06V 10/273; G06V 40/10–103; G06V 40/161–167; G06V 2201/07; G06V 10/28; G06V 10/457; G06V 10/751; G06V 20/52; G06V 20/58–582
See application file for complete search history.

(56) References Cited

FOREIGN PATENT DOCUMENTS

| CN | 11582166 | A |   | 8/2020 | |
|----|----------|---|---|--------|---|
| CN | 111629181 | A | * | 9/2020 | ............. G06V 20/52 |
| CN | 111639181 | A | * | 9/2020 | ........... G06F 16/325 |
| CN | 112016445 | A |   | 12/2020 | |
| CN | 112132043 | A |   | 12/2020 | |
| CN | 112418040 | A |   | 2/2021 | |

OTHER PUBLICATIONS

Ghadiri, Farnoosh, Robert Bergevin, and Guillaume-Alexandre Bilodeau. "From superpixel to human shape modelling for carried object detection." Pattern Recognition 89 (2019): 134-150 (Year: 2019).*
Pedestrian Detection Algorithm, https://zhuanlan.zhihu.com/p/37468092, retrieved on Sep. 2, 2022.
OpenCV_Connected Component Analysis-Labeling, https://www.cnblogs.com/liutianrui1/articles/10108106.html, retrieved on Sep. 2, 2022.
CN202180000581.7 First office action issued on Dec. 24, 2025.

* cited by examiner

METHOD AND DEVICE FOR DETECTING OBSTACLES, AND COMPUTER STORAGE MEDIUM

CROSS-PREFERENCE TO RELATED APPLICATION

This application is a U.S. national application of international application No. PCT/CN2021/082778, filed on Mar. 24, 2021, the content of which is incorporated herein by reference in its entirety.

TECHNICAL FIELD

The present disclosure relates to the field of security monitoring, and in particular relates to a method and device for detecting obstacles, and a computer storage medium thereof.

BACKGROUND

At present, some specific regions (such as fire escapes) are not allowed to be stacked with sundries. In the case that sundries are present, the staff need to clean up them in time to avoid affecting normal use of these specific regions (such as fire escapes).

In a method for detecting obstacles in a region, automatic detection of foreign articles is performed on a monitored region in real time. In the case that foreign articles are detected in the monitored region, a warning is sent automatically and a work order is generated. Then, the staff go to the scene to dispose the articles, and the warning is removed upon disposal of the articles.

SUMMARY

According to an aspect of the present disclosure, a method for detecting obstacles is provided. The method includes:
  acquiring a monitored image of a monitored region;
  performing object detection on the monitored image;
  performing pedestrian detection on the monitored image;
  in response to acquiring an object identification group including at least one object identification box by the object detection, and acquiring at least one pedestrian identification box by the pedestrian detection, acquiring a to-be-determined object identification group by removing an object identification box in the object identification group associated with the at least one pedestrian identification box, wherein the object identification box includes an image of an object in the monitored image, and the pedestrian identification box includes an image of a pedestrian in the monitored image; and
  in response to determining that an object identification box is present in the to-be-determined object identification group, determining that an obstacle is present in the monitored region.

Optionally, prior to acquiring the to-be-determined object identification group by removing the object identification box in the object identification group associated with the at least one pedestrian identification box, the method includes:
  determining whether an object identification box overlapped with the at least one pedestrian identification box is present in the object identification group; and
  in response to determining that a first object identification box overlapped with a first pedestrian identification box among the at least one pedestrian identification box is present, determining the first object identification box as the object identification box associated with the first pedestrian identification box.

Optionally, prior to acquiring the to-be-determined object identification group by removing the object identification box in the object identification group associated with the at least one pedestrian identification box, the method includes:
  determining whether the object identification group includes an object identification box overlapped with the at least one pedestrian identification box is present in the object identification group; and
  in response to determining that a first object identification box overlapped with a first pedestrian identification box among the at least one pedestrian identification box is present, determining whether the first object identification box is within a range of the first pedestrian identification box in a first direction, wherein the first direction is a height direction of a pedestrian in the first pedestrian identification box; and
  in response to determining that the first object identification box is within the range of the first pedestrian identification box in the first direction, determining the first object identification box as the object identification box associated with the first pedestrian identification box.

Optionally, performing the object detection on the monitored image includes:
  acquiring a pixel difference image between the monitored image and a target template image in a template group, wherein a pixel value of a pixel point at a first position in the pixel difference image is a target difference value, the target difference value is an absolute value of a difference value between a pixel value of a pixel point at the first position in the monitored image and a pixel value of a pixel point at the first position in the target template image, the template group includes at least two template images of the monitored region without obstacles or pedestrians under different lighting conditions, or the template group includes one template image of the monitored region without obstacles or pedestrians, and the target template image is a template image in the template group, which has the smallest difference from the monitored image;
  acquiring a binarized image by binarizing the pixel difference image;
  performing connected component analysis on the binarized image;
  in response to acquiring at least one connected component by the connected component analysis, determining whether a connected component with an area greater than a first threshold is present in the at least one connected component; and
  in response to determining that a connected component with an area greater than the first threshold is present, acquiring a circumscribed graph of the connected component with the area greater than the first threshold, wherein the circumscribed graph is the object identification box.

Optionally, in response to determining that the object identification box is present in the to-be-determined object identification group, upon determining that the obstacle is present in the monitored region, the method further includes:
  acquiring a target position of a target region in the monitored region;
  determining whether an object identification box overlapped with the target position is present in the to-be-determined object identification group; and in response to determining that the object identification box overlapped with the target position is present, determining that an obstacle is present in the target region.

Optionally, in response to determining that the object identification box overlapped with the target position is present, upon determining that the obstacle is present in the target region, the method further includes:

issuing an obstacle notice;

suspending the object detection and the pedestrian detection that are performed on the monitored image; and upon receipt of an instruction that the obstacle is cleared in response to the obstacle notice, resuming the object detection and the pedestrian detection on the monitored image, and performing the step of acquiring the to-be-determined object identification group by removing the object identification box in the object identification group associated with the at least one pedestrian identification box.

Optionally, an edge of a specified color is resent at the target position, and acquiring the target position of the target region in the monitored region, in the monitored image includes:

determining the target position of the target region in the monitored image by image recognition.

Optionally, acquiring the monitored image of the monitored region includes:

acquiring a video data stream from a streaming media server;

storing the video data stream in a data buffer; and acquiring the monitored image of the monitored region from the data buffer.

According to another aspect of the present disclosure, an apparatus for detecting obstacles is provided. The apparatus includes:

an image acquiring module, configured to acquire a monitored image of a monitored region;

an object detecting module, configured to perform object detection on the monitored image;

a pedestrian detecting module, configured to perform pedestrian detection on the monitored image;

a removing module, configured to, in response to acquiring an object identification group including at least one object identification box by the object detection, and at least one pedestrian identification box is acquired from the pedestrian detection, acquire a to-be-determined object identification group by removing an object identification box in the object identification group associated with the at least one pedestrian identification box, wherein the object identification box includes an image of an object in the monitored image, and the pedestrian identification box includes an image of a pedestrian in the monitored image; and a determining module, configured to, in response to determining that an object identification box is present in the to-be-determined object identification group, determine that an obstacle is present in the monitored region.

Optionally, the apparatus further includes:

a first overlap determining module, configured to determine whether an object identification box overlapped with the at least one pedestrian identification box is present in the object identification group; and a first association determining module, configured to, in response to determining that a first object identification box overlapped with a first pedestrian identification box among the at least one pedestrian identification box is present, determine the first object identification box as the object identification box associated with the first pedestrian identification box.

Optionally, the apparatus further includes:

a second overlap determining module, configured to determine whether the object identification group includes an object identification box overlapped with the at least one pedestrian identification box;

an overlap range determining module, configured to, in response to determining that a first object identification box overlapped with a first pedestrian identification box among the at least one pedestrian identification box is present, determine whether the first object identification box is within a range of the first pedestrian identification box in a first direction, wherein the first direction is a height direction of a pedestrian in the first pedestrian identification box; and a second association determining module, configured to, in response to determining that the first object identification box is within the range of the first pedestrian identification box in the first direction, determine the first object identification box as the object identification box associated with the first pedestrian identification box.

According to still another aspect of the present disclosure, a device for detecting obstacles is provided. The device includes a processor and a memory, wherein the memory stores at least one instruction, at least one program, code set, or instruction set, and the processor, when loading and executing the at least one instruction, the at least one program, the code set, or the instruction set, is caused to perform the method for detecting obstacles according to the above aspect.

According to still another aspect of the present disclosure, a non-volatile computer storage medium is provided. The non-volatile computer storage medium stores at least one instruction, at least one program, code set, or instruction set, and a processor, when loading and executing the at least one instruction, the at least one program, the code set, or the instruction set, is caused to perform the method for detecting obstacles according to the above aspect.

BRIEF DESCRIPTION OF THE DRAWINGS

In order to describe the technical solutions in the embodiments of the present disclosure more clearly, the following briefly introduces the accompanying drawings required for describing the embodiments. Apparently, the accompanying drawings in the following description show merely some embodiments of the present disclosure, and a person skilled in the art may derive other drawings from these accompanying drawings without creative efforts.

The embodiments of the present disclosure have been illustrated explicitly through the above drawings, and will be described in further detail hereinafter. These drawings and text descriptions are not intended to limit the scope of the inventive conception in any way, but to explain the concept of the present disclosure to persons skilled in the art with reference to specific embodiments.

DETAILED DESCRIPTION

In a process of detecting obstacles in the related art, false warnings may be generated when a pedestrian passes the monitored region, thereby causing a low accuracy of the detection method.

For clearer descriptions of the objectives, technical solutions, and advantages of the present disclosure, embodiments of the present disclosure are described in detail hereinafter in combination with the accompanying drawings.

Figure 1:
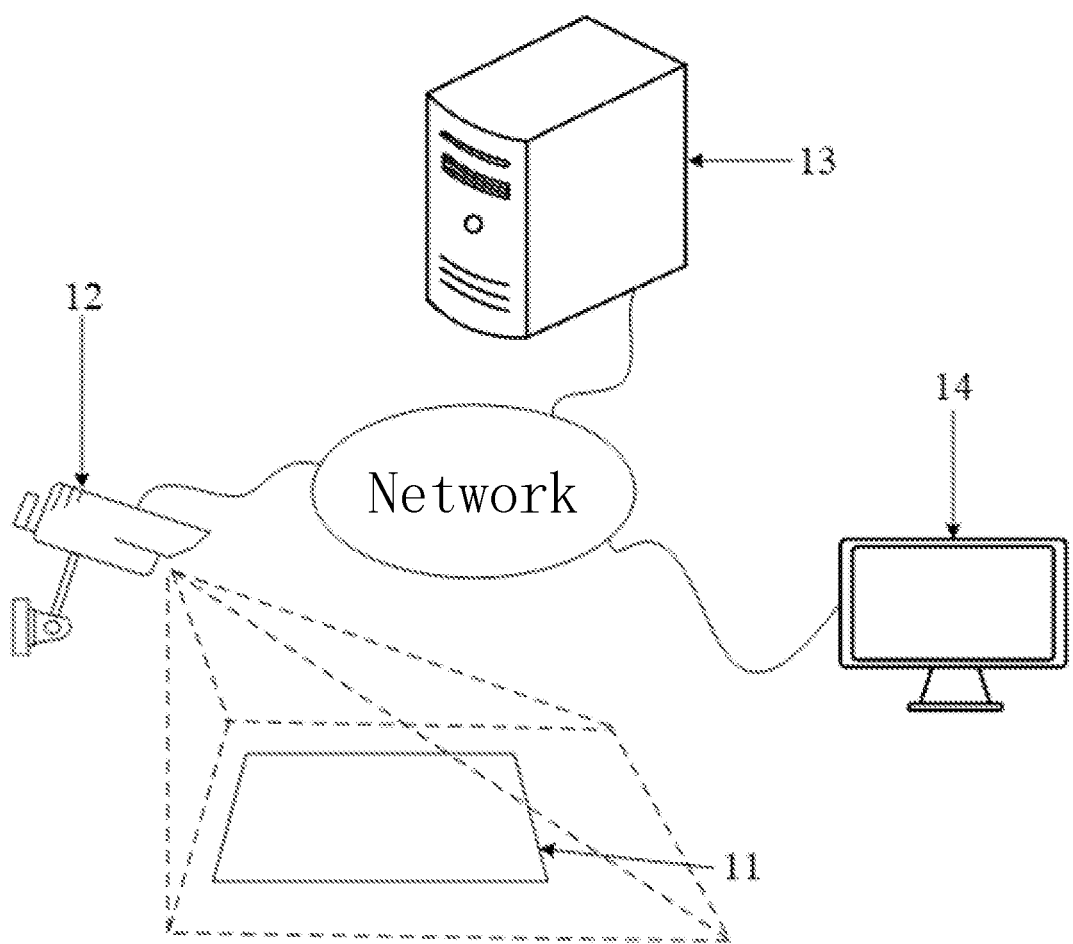
FIG. 1 is a schematic diagram of an implementation environment of a method for detecting obstacles according to an embodiment of the present disclosure.

FIG. 1 is a schematic diagram of an implementation environment for a method for detecting obstacles according to an embodiment of the present disclosure. The implementation environment may include a monitored region 11, a monitoring assembly 12, a server 13 and a terminal 14.

The monitored region 11 may include a fire escape, an important place of a warehouse, a surrounding region of a petrol station, a key region of an oil depot or the like.

The monitoring assembly 12 may include a camera.

The server 13 may include a server or a server cluster. The server 13 may include a streaming media server, a processing server (or referred to as an algorithm server) and a service server. For the streaming media server and the processing server, the followings may be included. The streaming media server may establish a wired or wireless connection to the camera, generate a video data stream from image data captured by the camera, and send the video data stream to the processing server; the processing server may perform the method according to the embodiment of the present disclosure to detect foreign objects and persons. The processing server sends alarm information to the service server in the case that an object is found in the monitored region. The service server may generate a work order in response to receiving the alarm information. Any two or three servers may be deployed on the same physical machine.

The terminal 12 may be a desktop computer, a mobile phone, a tablet computer, a notebook computer and various other terminals.

The terminal 12 may be connected with the server 13 in a wired or wireless fashion.

Application scenarios of the embodiment of the present disclosure may include the followings:

1) real-time obstacle detection can be performed on the fire escapes in the park to find out obstacles on the fire escapes at any time, and the staff can deal with the obstacles on the fire escapes in time to ensure the smoothness of the fire escapes in the case of a disaster; and 2) In important regions of a warehouse, obstacles are not allowed, the staff can deal with obstacles in time with the method for detecting obstacles according to the embodiment of the present disclosure, and the method for detecting obstacles can avoid misjudgment in the case that the staff deal with the obstacles.

Figure 2:
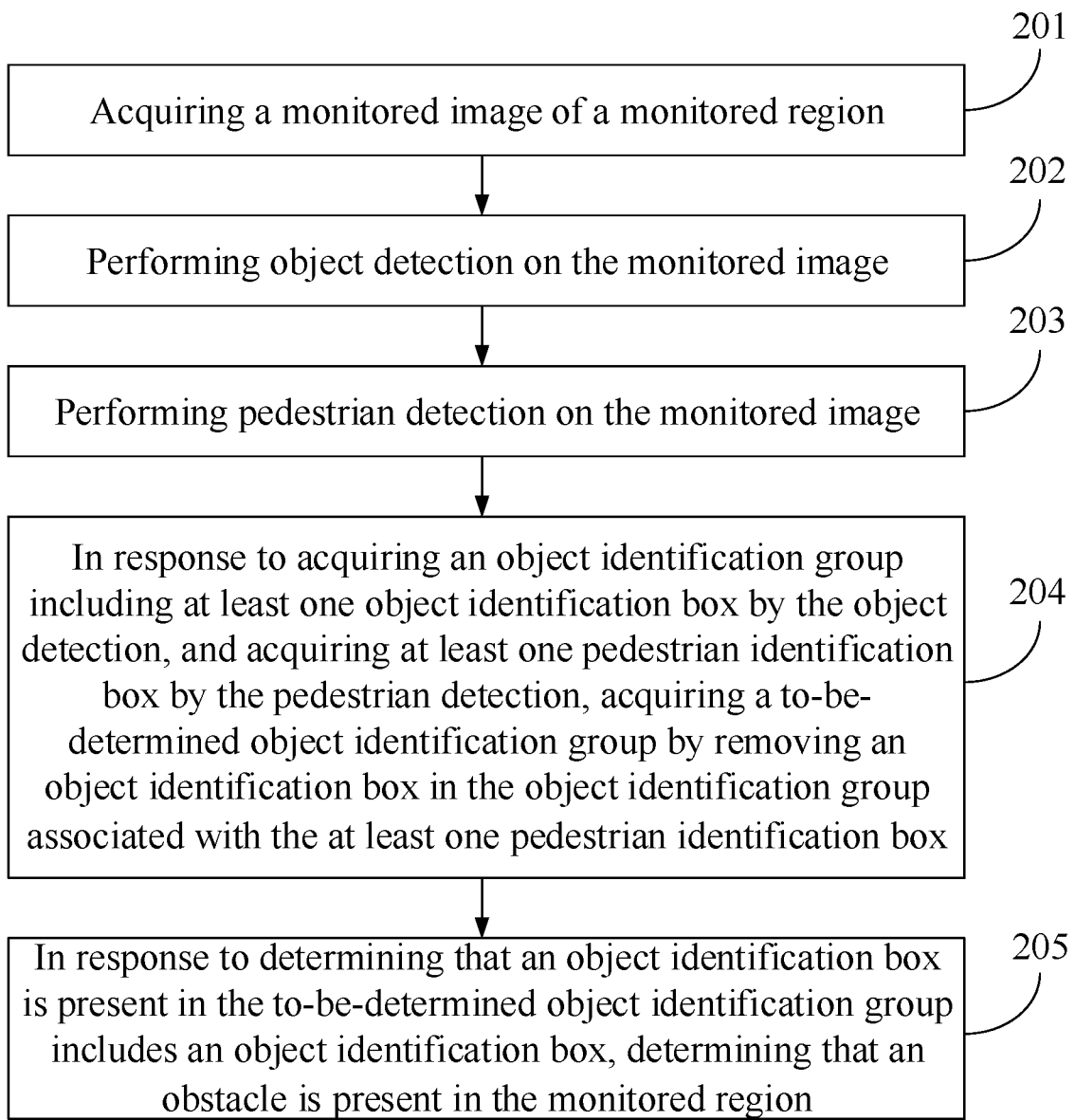
FIG. 2 is a flowchart of a method for detecting obstacles according to an embodiment of the present disclosure.

FIG. 2 is a flowchart of a method for detecting obstacles according to an embodiment of the present disclosure. The method is applicable the server in the implementation environment shown in FIG. 1. The method may include the following steps.

In step 201, a monitored image of a monitored region is acquired.

In step 202, object detection is performed on the monitored image.

In step 203, pedestrian detection is performed on the monitored image.

In step 204, in response to acquiring an object identification group including at least one object identification box by the object detection, and acquiring at least one pedestrian identification box by the pedestrian detection, a to-be-determined object identification group is acquired by removing an object identification box in the object identification group associated with the at least one pedestrian identification box.

The object identification box includes an image of an object in the monitored image, and the pedestrian identification box includes an image of a pedestrian in the monitored image.

In step 205, in response to determining that an object identification box is present in the to-be-determined object identification group, it is determined that an obstacle is present in the monitored region.

The association may refer to a situation in which a pedestrian carrying an object goes through the monitored region. That is, the pedestrian identification box is overlapped with the object identification box in the monitored image, so as to avoid a misjudgment caused in the case that a pedestrian carrying an object passes through the monitored region.

In summary, embodiments of the present disclosure provide a method for detecting obstacles. By performing object detection and pedestrian detection on a monitored image of a monitored region, an object identification group including an object identification box and a pedestrian identification box are acquired, and upon removing an object identification box associated with the pedestrian identification box, that an obstacle is present in the monitored region based on the object identification box in the object identification group is determined. False warning caused by presence of pedestrians in the monitored region can be avoided. The problem of low accuracy of methods for detecting obstacles in the related art can be solved, and the effect of improving the accuracy of the method for detecting obstacles can be achieved.

Figure 3:
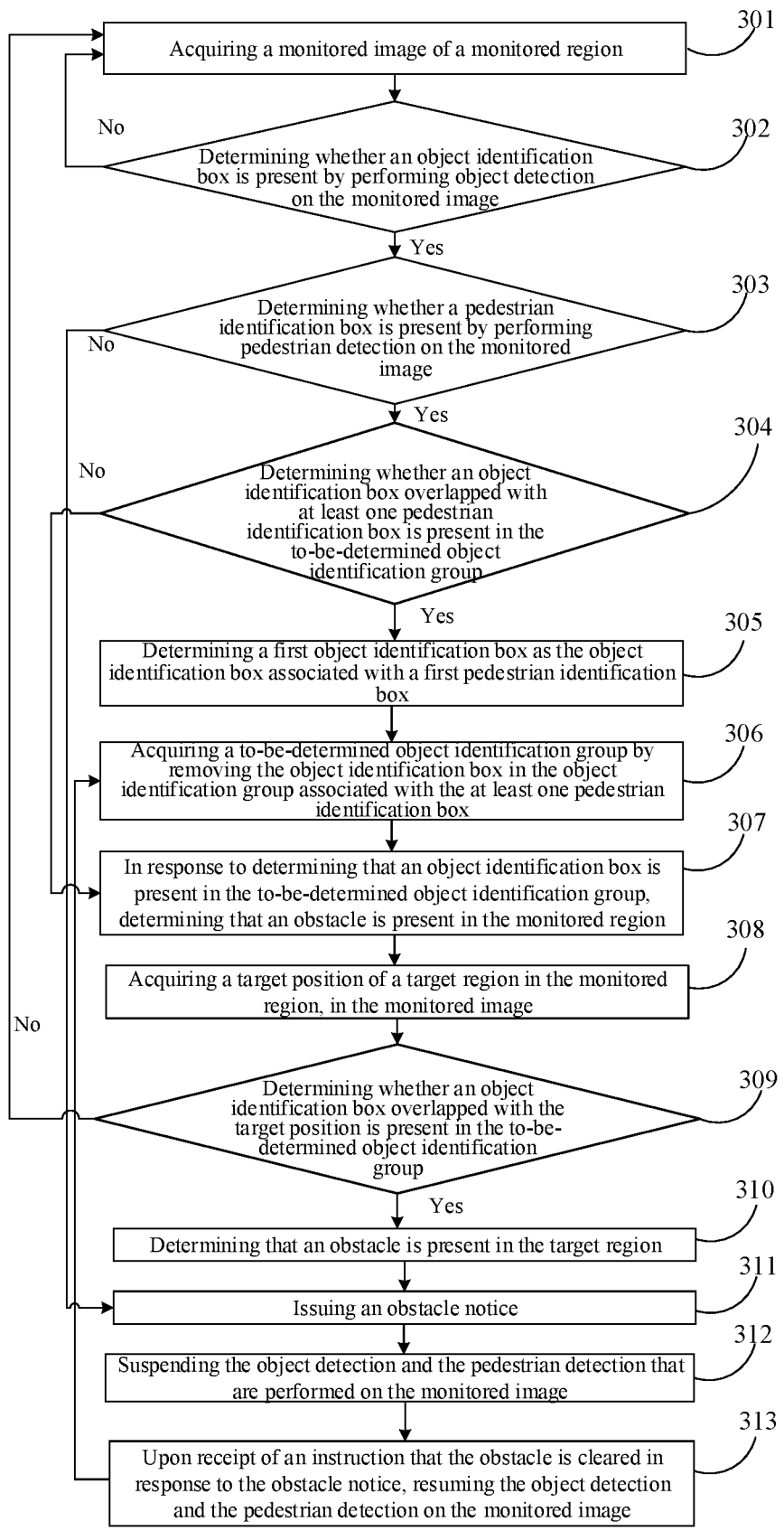
FIG. 3 is a flowchart of another method for detecting obstacles according to an embodiment of the present disclosure.

FIG. 3 is a flowchart of another method for detecting obstacles according to an embodiment of the present disclosure. The method is applicable the server in the implementation environment shown in FIG. 1. The method may include the following steps.

In step 301, a monitored image of a monitored region is acquired.

Prior to acquiring the monitored image of the monitored region, a template image of the monitored region may also be acquired. The template image may be an image of the monitored region without pedestrians or obstacles acquired by the monitoring assembly. The template group includes at least two template images of the monitored region without obstacles or pedestrians under different lighting conditions. By acquiring at least two template images under different lighting conditions, the problem of template image inconsistency caused by lighting condition changes in the morning, noon and evening in a day can be solved. The template image inconsistency caused by lighting condition changes in the case that a light is turned on or off can be avoided, or the template group may also include one template image of the monitored region without obstacles or pedestrians.

In the method for detecting obstacles, the monitored image may be processed in a fashion of multi-thread processing, which may include a first thread, a data buffer and a second thread.

In the case that the monitoring assembly acquires the monitored image, the streaming media server converts video data captured through monitoring into a video data stream, and the first thread acquires the video data stream from the streaming media server.

The first thread stores the video data stream in the data buffer. The second thread acquires the monitored image of the monitored region from the data buffer, and then the algorithm server detects an object image and a pedestrian image among the monitored image, so as to solve the problem of channel blocking in reading the video data by the server.

In step 302, object detection is performed on the monitored image to determine whether an object identification group including at least one object identification box which includes an image of an object in the monitored image is present. The monitored image may be acquired via the monitoring assembly. The object detection is performed on the acquired monitored image, and the image of the object in the monitored image may be identified by comparing the monitored image with the template image.

In response to acquiring no object identification box, the process returns to step 301.

In response to acquiring an object identification group including at least one object identification box, and the object identification box including the image of the object in the monitored image, step 303 is performed.

Figure 4:
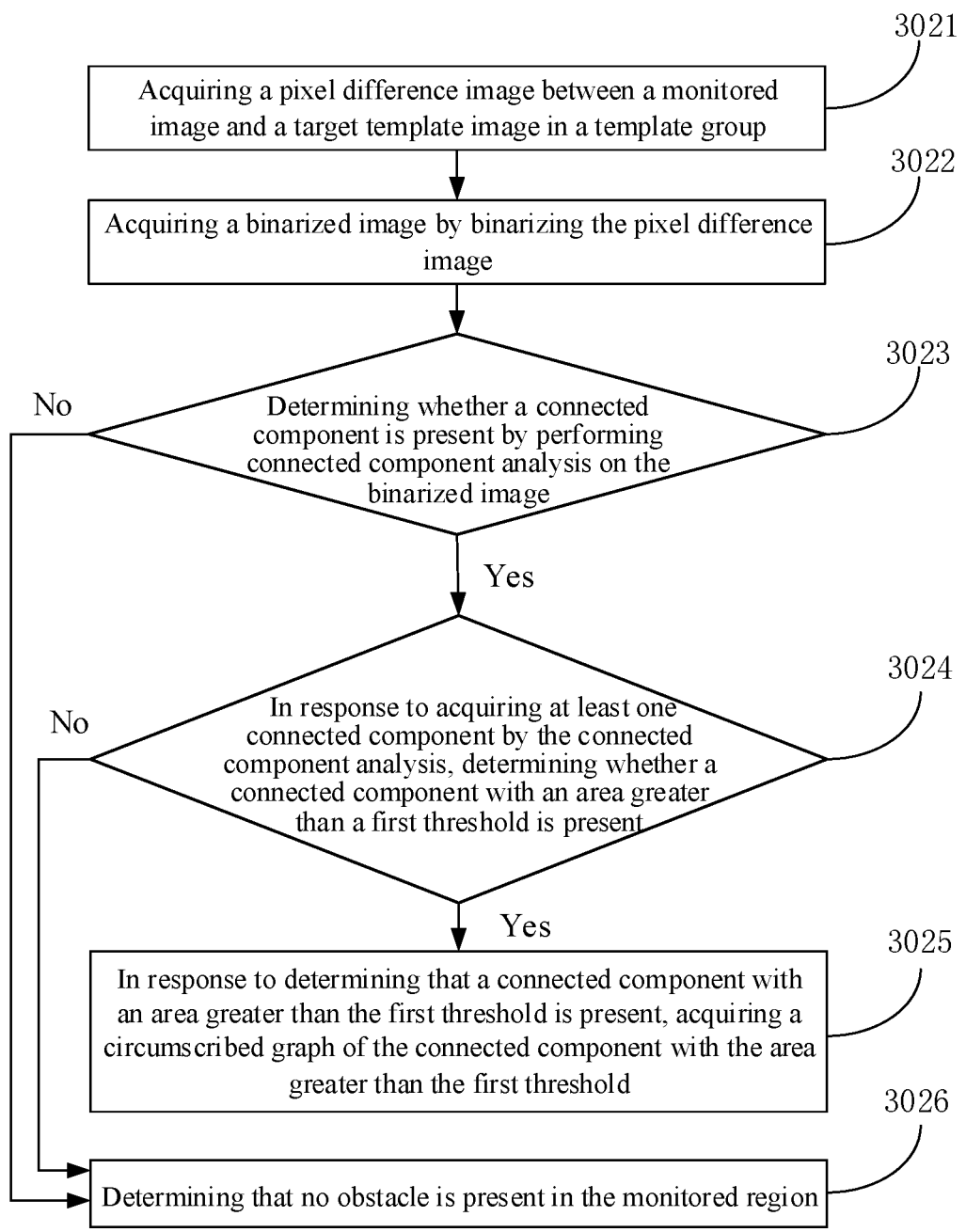
FIG. 4 is a flowchart of performing object detection on a monitored image in the method shown in FIG. 3.

As shown in FIG. 4, step 302 may include the following four sub-steps.

In sub-step 3021, a pixel difference image between the monitored image and the target template image in the template group is acquired.

A pixel value of a pixel point at a first position in the pixel difference image is a target difference value, the target difference value is an absolute value of a difference value between a pixel value of a pixel point at the first position in the monitored image and a pixel value of a pixel point at the first position in the target template image. The target template image is a template image in the template group, which has the smallest difference from the monitored image.

In the case that the template group includes a template image of the monitored region without obstacles or pedestrians, the template image is the target template.

The pixel value is a value assigned by a computer in the case that an image is digitized, and the pixel value represents the information of a certain pixel of the image. For a color image, the pixel value of a pixel may represent the red (R), green (G), and blue (B) values of the pixel, for example, (255, 255, 255), or it may represent a gray-scale value of a pixel, for example, 255.

Exemplarily, in the case that the pixel value is a gray-scale value, a monitored image A and a target template image B are rectangular images of the same size, a pixel value of a pixel point in a first row and a first column in the monitored image A is A1, and a pixel value of a pixel point in a first row and a first column in the target template image B is B1, then the value of |A1-B1| is a target difference value between the pixel values of the pixel points at the same positions in the monitored image A and the target template image B, and a pixel value of a pixel point in a first row and a first column in a pixel difference image C corresponding to the monitored image A and the target template image B is C1=|A1-B1|.

In this step, a template image in the template group with the smallest difference from the monitored image is selected as the target template image, such that the effects of lighting conditions, shadow and the like on a detection effect can be avoided.

The difference between the template image and the monitored image may be determined in various fashions. Exemplarily, a template image in the template group with a sum of pixel values (the sum of all pixel value in the image) closest to a sum of pixel values of the monitored image may be determined as the target template image; or, a template image with a shooting time closest to that of the monitored image may be determined as the target template image.

In sub-step 3022, a binarized image is acquired by binarizing the pixel difference image.

Image binarization may refer to a process of setting the gray-scale values of pixel points on an image to 0 or 255, i.e., a process of rendering the entire image with a distinct black and white effect. The image binarization may reduce the amount of data in an image to highlight an outline of an obstacle.

The pixel value of each pixel in the pixel difference image may be determined based on a threshold, any pixel value greater than the threshold is set to 0 (a pixel with a pixel value greater than the threshold may be considered as the pixel of a foreground image), and any pixel value less than or equal to the threshold is set to 255 (a pixel with a value less than or equal to the threshold may be considered as the pixel of a background image), thereby acquiring the binarized image.

In sub-step 3023, connected component analysis is performed on the binarized image to determine whether a connected component is present. In response to determining that a connected component is present, sub-step 3024 is performed, and in response to determining that no connected component is present, sub-step 3026 is performed.

A connected component refers to an image region composed of pixel points that have the same pixel value and are adjacent in position in an image. That is, the mutually connected points form a region, and the disconnected points form a different region. such a set of points with all points connected to each other may be referred to as a connected component.

Connected component analysis refers to finding out and labeling each connected component in an image. The connected component analysis is a commonly method in image analysis and processing. In an exemplary embodiment, the connected component analysis is applicable to license plate recognition, text recognition, subtitle recognition, etc. An object of the connected component analysis processing is usually a binarized image.

Exemplarily, the connected component analysis may be performed on the binarized image by seed filling or some other methods, which is not limited in the embodiments of the present disclosure.

In sub-step 3024, in response to acquiring at least one connected component by the connected component analysis, whether a connected component with an area greater than a first threshold is present is determined.

In response to determining that a connected component with an area greater than the first threshold is present, sub-step 3025 is performed, and in response to determining that no connected component with an area greater than the first threshold is present, sub-step 3026 is performed.

A connected component with an area less than or equal to the first threshold among the connected components may correspond to a small obstacle in the monitored region that does not affect the use of the monitored region (for example, a fire escape).

In sub-step 3025, in response to determining that a connected component with an area greater than the first threshold is present, a circumscribed graph of the connected component with the area greater than the first threshold is acquired, the circumscribed graph being the object identification box.

In this step, connected components with areas less than or equal to the first threshold may be removed from the connected components to acquire the connected components with areas greater than the first threshold, and the circumscribed graphs of these connected components with the areas greater than the first threshold may be acquired, wherein the circumscribed graphs may be determined as object identification boxes.

The circumscribed graphs of the connected components with the areas greater than the first threshold among the connected components may be rectangle. Exemplarily, all the points in a connected component are checked, and a maximum value (max_x) and a minimum value (min_x) of the abscissa as well as a maximum value (max_y) and a minimum value (min_y) of the ordinate are counted. Then, the circumscribed rectangle is [min_x, min_y, max_x, max_y].

Figure 5:
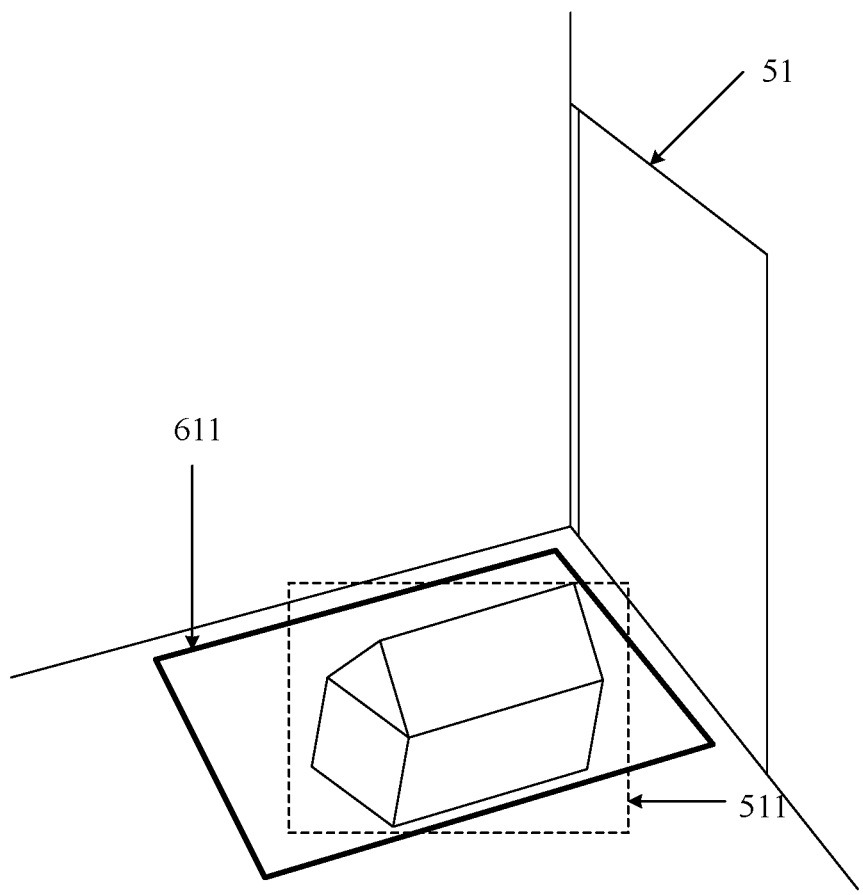
FIG. 5 is a monitored image according to an embodiment of the present disclosure.

As shown in FIG. 5, a monitored image according to an embodiment of the present disclosure in the case that sub-step 3025 is completed is illustrated. In the case that a monitored image with an emergency exit 51 is taken as the monitored region, an object identification box 511 is acquired.

In sub-step 3026, it is determined that no obstacle is present in the monitored region.

In response to determining that no obstacle in the monitored region is present, step 301 is performed.

In step 303, pedestrian detection is performed on the monitored image to determine whether at least one pedestrian identification box is present.

The pedestrian identification box includes an image of a pedestrian in the monitored image. The pedestrian detection is a technology for determining whether a pedestrian is present in an image or video sequence and providing accurate positioning by means of the computer vision technology. The pedestrian detection technology can be combined with pedestrian tracking, pedestrian re-identification and other technologies, and is applicable to artificial intelligence systems, driving assistance systems for vehicles, intelligent robots, intelligent video monitoring, human behavior analysis, intelligent transportation systems and other fields. Pedestrian detection algorithms are classified into traditional methods and deep learning methods. Representative algorithms include HOG+SVM and Faster R-CNN.

In response to acquiring no pedestrian identification box, step 311 is performed.

In response to acquiring an object identification group including at least one object identification box, step 304 is performed.

Figure 6:
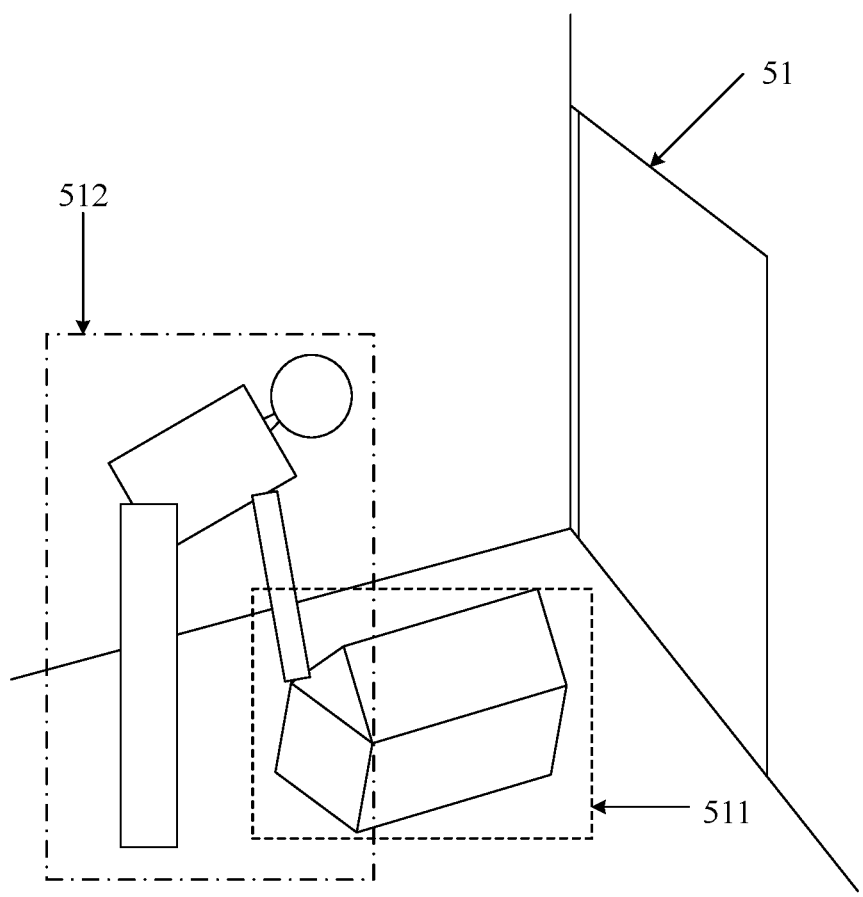
FIG. 6 is another monitored image according to an embodiment of the present disclosure.

As shown in FIG. 6, another monitored image according to an embodiment of the present disclosure in the case that step 303 is completed is illustrated. In the case that a monitored image with an emergency exit 51 is taken the monitored region, a pedestrian identification box 512 is acquired.

In addition, in the embodiment of the present disclosure, the sequence of step 303 and step 302 is not limited. That is, step 303 may be performed first, and then step 302 may be performed, or step 302 and step 303 may be performed simultaneously. Accordingly, the server may not issue an alarm in response to detecting a pedestrian and not detecting an object, and step 301 is performed.

In step 304, whether an object identification box overlapped with at least one pedestrian identification box is present in the to-be-determined object identification group is determined. The overlapping of the object identification box with the pedestrian identification box may refer to at least one intersection point present between the object identification box and the pedestrian identification box.

As shown in FIG. 6, whether the object identification box 511 in the object identification group is overlapped with the pedestrian identification box 512 is determined. In response to determining that an overlap is present, step 305 is performed. In response to determining that no overlap is present, the object identification box in the object identification group may be classified into a to-be-determined object identification group, and step 307 is performed to identify an object in the object identification box as an obstacle.

In step 305, in response to determining that a first object identification box overlapped with a first pedestrian identification box among the at least one pedestrian identification box is present, the first object identification box is determined as the object identification box associated with the first pedestrian identification box.

The first object identification box is overlapped with the first pedestrian identification box, that is, the first object image is overlapped with the first pedestrian image in the corresponding monitored image, it can be considered that a pedestrian carrying an object goes through the monitored region.

Figure 7:
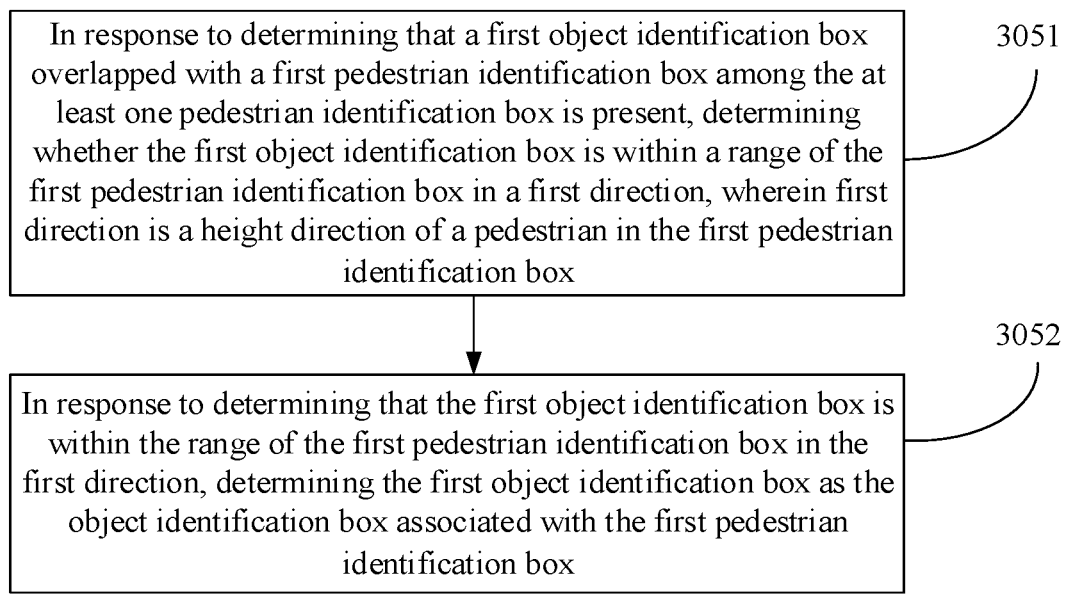
FIG. 7 is a flowchart of determining a first object identification box as an object identification box associated with a first pedestrian identification box, in the method shown in FIG. 3.

As shown in FIG. 7, step 305 may include the following two sub-steps.

In sub-step 3051, in response to determining that a first object identification box overlapped with a first pedestrian identification box among the at least one pedestrian identification box is present, whether the first object identification box is within a range of the first pedestrian identification box in a first direction is determined, wherein the first direction is a height direction of a pedestrian in the first pedestrian identification box.

Figure 8:
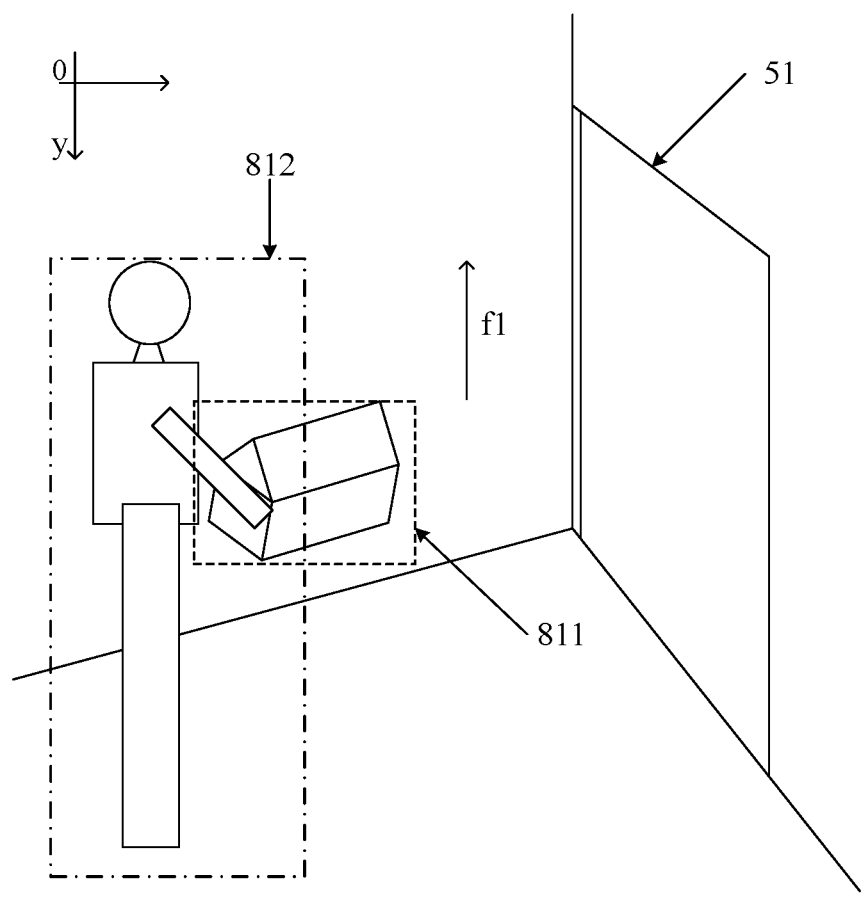
FIG. 8 is another monitored image according to an embodiment of the present disclosure.

As shown in FIG. 8, which illustrates another monitored image according to an embodiment of the present disclosure, a first object identification box 811 is within a range of a first pedestrian identification box 812 in a first direction f1. That is, the first object image is overlapped with the first pedestrian image in the corresponding monitored image. Then, it is considered that a pedestrian carrying an object goes through the monitored region.

Exemplarily, as shown in FIG. 8, the coordinates of a rectangular box of a pedestrian in a first direction f1 are p=[y1, y2], and the coordinates of a rectangular box of an object in the first direction f1 are m=[y3, y4].

In the case that the rectangular box of the pedestrian intersects with the rectangular box of the object, and y1<y3, y2>y4, it may be considered that the object is within a control range of the pedestrian. That is, the pedestrian carrying (or taking along) the object goes through the monitored region. At this point, the object may be filtered out without triggering an alarm. In this way, a false alarm triggered by the pedestrian who carries the object and goes through the monitored region can be avoided.

Figure 9:
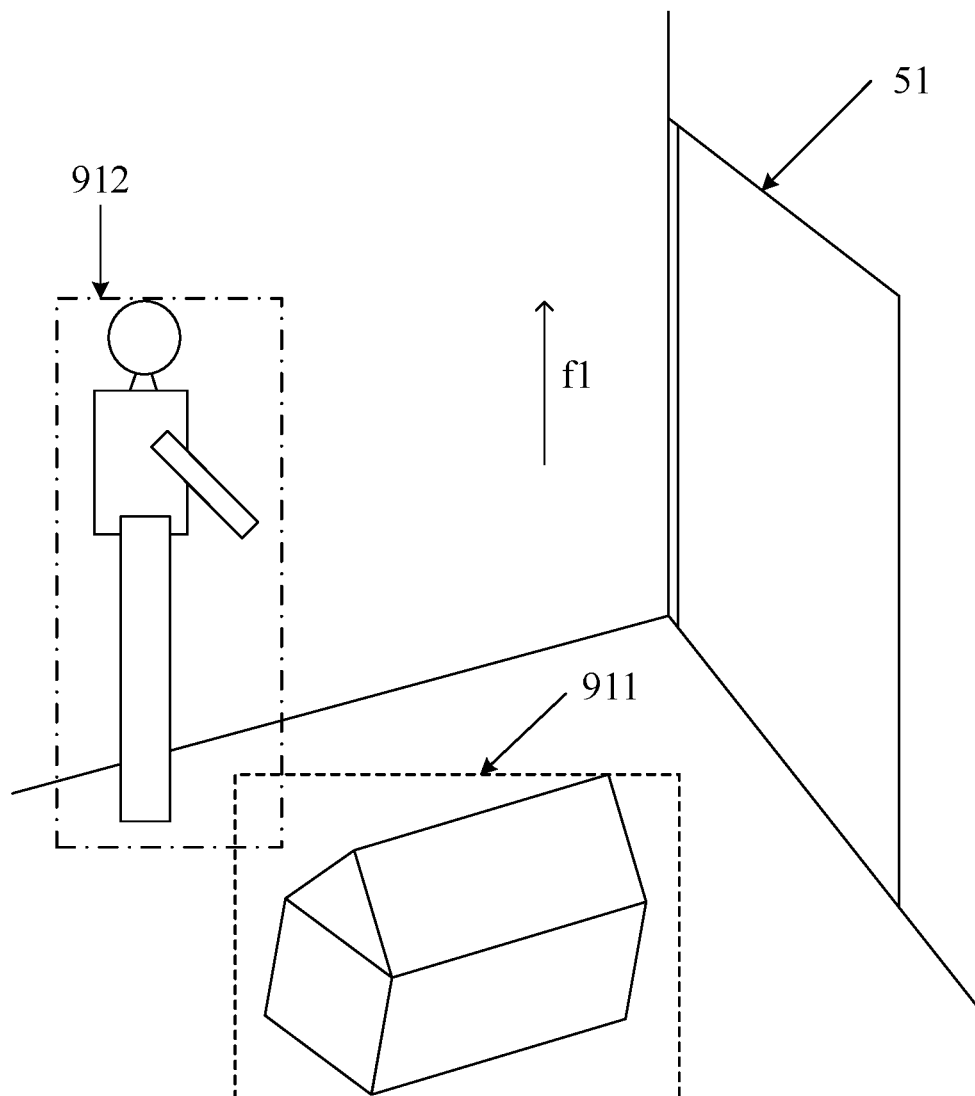
FIG. 9 is another monitored image according to an embodiment of the present disclosure.

As shown in FIG. 9, which illustrates another monitored image according to an embodiment of the present disclosure, a first object identification box 911 is not within a range of a first pedestrian identification box 912 in a first direction f1. That is, the first object image is overlapped with the first pedestrian image in the corresponding monitored image. Then, it can be further determined that the object is an obstacle.

In sub-step 3052, in response to the first object identification box being within the range of the first pedestrian identification box in the first direction, the first object identification box is determined as the object identification box associated with the first pedestrian identification box.

In this way, a false alarm triggered by the pedestrian who carries the object and goes through the monitored region can be avoided.

In step 306, a to-be-determined object identification group is acquired by removing the object identification box in the object identification group associated with the at least one pedestrian identification box.

The object identification box in the object identification group associated with the at least one pedestrian identification box, may be determined as a pedestrian carrying an object and going through the monitored region. At this point, the object in the monitored image may be not obstacle.

Exemplarily, each object in the first object identification box and each pedestrian in the first pedestrian identification box are scanned. In response to determining that an object identification box associated with the pedestrian identification box is present in the object identification box, the associated objected identification box is removed from the object identification group.

In step 307, in response to determining that an object identification box is present in the to-be-determined object identification group, it is determined that an obstacle is present in the monitored region.

An object in the object identification box in the to-be-determined object identification group may be determined as an obstacle.

In response to determining that no object identification box is present in the to-be-determined object identification group, step 302 is performed again.

In step 308, a target position of a target region in the monitored region is acquired in the monitored image.

The target region refers to a specific more important monitored region in the monitored region, and it may be set that no obstacle is allowed in the target region. As shown in FIG. 5, a target position 611 of the target region may be a region in front of an exit of a fire escape. This region should be kept clear at all times, and no obstacle is allowed.

The target position of the target region in the monitored region is acquired in the monitored image by the following two methods.

In a first method: The target position of the target region is manually identified in the monitored image. A plurality of target regions may be identified in one monitored image.

In a second method: The target region is defined by pasting the ground of the monitored region with a tape of a specified color (yellow, red, or blue, which is not limited in this embodiment). During shooting, an outline of the target region is automatically acquired by Hough transform based on color segmentation. In this way, the target position of the target region in the monitored region is acquired in the monitored image.

Hough transform is a feature detection which has been widely applied in image analysis, computer vision and digital image processing. The Hough transform is applicable to feature identification of an object, for example, lines formed by the tape in the monitored region. An algorithm flow of Hough transform may include determining the shape of the object by based on the algorithm performs voting in a parameter space given object and the type of the shape to be identified.

In step 309, whether an object identification box overlapped with the target position is present in the to-be-determined object identification group is determined.

By determining that the object identification box in the to-be-determined object identification group is overlapped with the target region, it can be determined whether an object in the object identification box is within the target region. In response to determining that no object identification box overlapped with the target position is present in the to-be-determined object identification group, step 301 is performed, and in response to determining that an object identification box overlapped with the target position is present in the to-be-determined object identification group, step 310 is performed.

In step 310, in response to determining that an object identification box overlapped with the target position is present, it is determined that an obstacle is present in the target region.

As shown in FIG. 5, the object identification group includes the object identification box 511 overlapped with the target position 611, and it can be then determined that the object in the overlapped object identification box 511 is an obstacle in the target region.

In step 311, an obstacle notice is issued.

In response to determining that an obstacle is present in the target region, the server may send an obstacle notice via the terminal. That is, a to-be-processed work order may be generated on the terminal. In response to receiving the to-be-processed work order, the staff may go to the target region in time to deal with the obstacle.

In step 312, the object detection and the pedestrian detection that are performed on the monitored image are suspended.

In the case that the obstacle notice is issued, the object detection and the pedestrian detection that are performed on the monitored image may be suspended. In this way, repeated detection and repeated issuance of the obstacle notice can be avoided when the staff is on the way to the target region and is dealing with the obstacle, thereby reducing the number of false alarms.

A communication method for suspending the object detection may include a remote dictionary server (REDIS) communication method or a hyper text transfer protocol (HTTP) communication method. In the REDIS communication method, the obstacle notice may be received with a fixed topic.

In step 313, upon receipt of an instruction that the obstacle is cleared in response to the obstacle notice, the object detection and the pedestrian detection are resumed on the monitored image, and the step of acquiring the to-be-determined object identification group by removing the object identification box in the object identification group associated with the at least one pedestrian identification box, is performed.

In the case that the obstacle is cleared, the object detection and the pedestrian detection may be resumed on the monitored image, and the step of acquiring the to-be-determined object identification group by removing the object identification box in the object identification group associated with the at least one pedestrian identification box may be performed again to form a detection loop, thereby performing the obstacle detection on the target region continuously.

In summary, the embodiments of the present disclosure provide a method for detecting obstacles. By performing object detection and pedestrian detection on a monitored image of a monitored region, an object identification group including an object identification box and a pedestrian identification box are acquired, and upon removing an object identification box associated with the pedestrian identification box that an obstacle is present in the monitored region based on the object identification box in the object identification group is determined. False warning caused by presence of pedestrians in the monitored region can be avoided. The problem of low accuracy of methods for detecting obstacles in the related art can be solved, and the effect of improving the accuracy of the method for detecting obstacles can be achieved.

Figure 10:
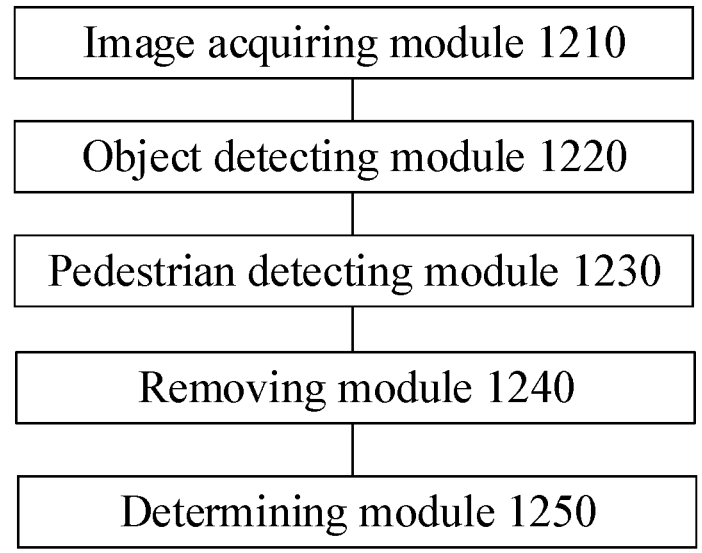
FIG. 10 is a structural block diagram of an apparatus for detecting obstacles according to an embodiment of the present disclosure.

FIG. 10 is a structural block diagram of an apparatus 1200 for detecting obstacles according to an embodiment of the present disclosure. The apparatus 1200 includes:
    an image acquiring module 1210, configured to acquire a monitored image of a monitored region;
    an object detecting module 1220, configured to perform object detection on the monitored image;
    a pedestrian detecting module 1230, configured to perform pedestrian detection on the monitored image;
    a removing module 1240, configured to, in response to acquiring an object identification group including at least one object identification box by the object detection, and at least one pedestrian identification box is acquired from the pedestrian detection, acquire a to-be-determined object identification group by removing an object identification box in the object identification group associated with the at least one pedestrian identification box, wherein the object identification box includes an image of an object in the monitored image, and the pedestrian identification box includes an image of a pedestrian in the monitored image; and
    a determining module 1250, configured to, in response to determining that an object identification box is present in the to-be-determined object identification group, determine that an obstacle is present in the monitored region.

Figure 11:
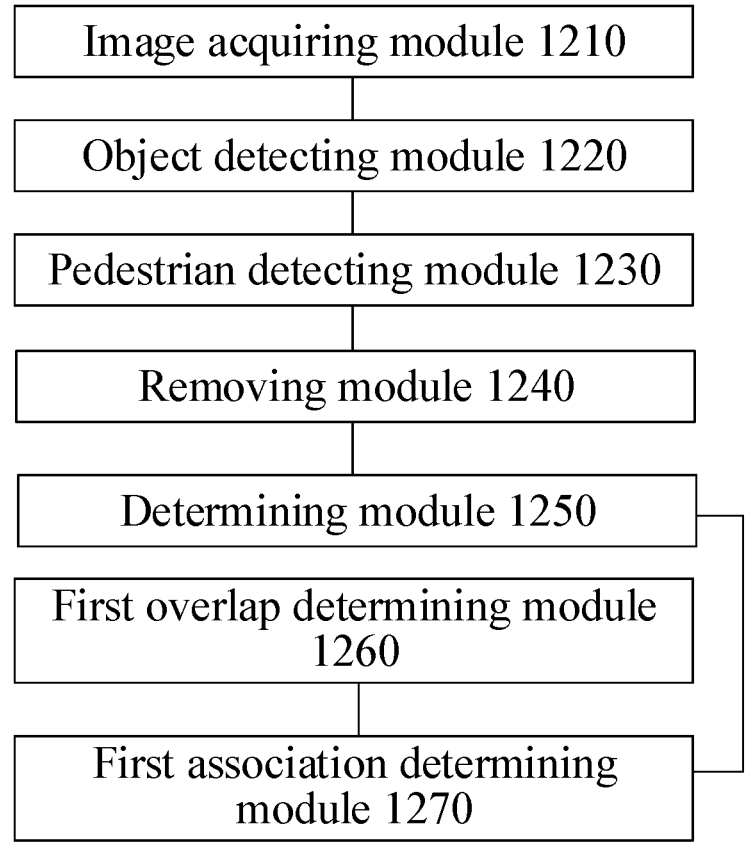
FIG. 11 is a structural block diagram of another apparatus for detecting obstacles according to an embodiment of the present disclosure.

Optionally, as shown in FIG. 11, which is a block diagram of another apparatus 1200 for detecting obstacles according to an embodiment of the present disclosure, the apparatus 1200 further includes:
    a first overlap determining module 1260, configured to determine whether an object identification box overlapped with the at least one pedestrian identification box is present in the object identification group; and
    a first association determining module 1270, configured to, in response to determining that a first object identification box overlapped with a first pedestrian identification box among the at least one pedestrian identification box is present, determine the first object identification box as the object identification box associated with the first pedestrian identification box.

Figure 12:
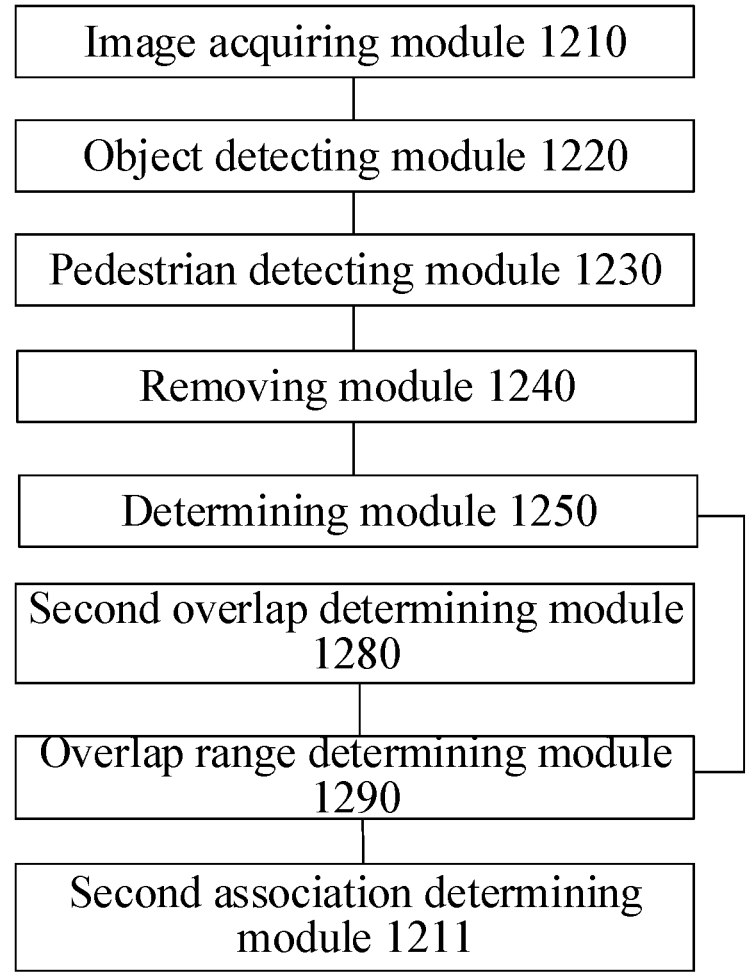
FIG. 12 is a structural block diagram of another apparatus for detecting obstacles according to an embodiment of the present disclosure.

Optionally, as shown in FIG. 12, which is a block diagram of still another apparatus 1200 for detecting obstacles according to an embodiment of the present disclosure, the apparatus further includes:
    a second overlap determining module 1280, configured to determine whether an object identification box overlapped with the at least one pedestrian identification box is present in the object identification group;
    an overlap range determining module 1290, configured to, in response to determining that a first object identification box overlapped with a first pedestrian identification box among the at least one pedestrian identification box is present, determine whether the first object identification box is within a range of the first pedestrian identification box in a first direction, wherein the first direction is a height direction of a pedestrian in the first pedestrian identification box; and
    a second association determining module 1211, configured to, in response to determining that the first object identification box is within the range of the first pedestrian identification box in the first direction, determine the first object identification box as the object identification box associated with the first pedestrian identification box.

In summary, with the apparatus for detecting obstacles according to the embodiments of the present disclosure, by performing object detection and pedestrian detection on a monitored image of a monitored region, an object identification group including an object identification box and a pedestrian identification box are acquired, and upon removing an object identification box associated with the pedestrian identification box, it is determined that an obstacle is present in the monitored region based on the object identification box in the object identification group. False warning caused by presence of pedestrians in the monitored region can be avoided. The problem of low accuracy of methods for detecting obstacles in the related art can be solved, and the effect of improving the accuracy of the method for detecting obstacles can be achieved.

Figure 13:
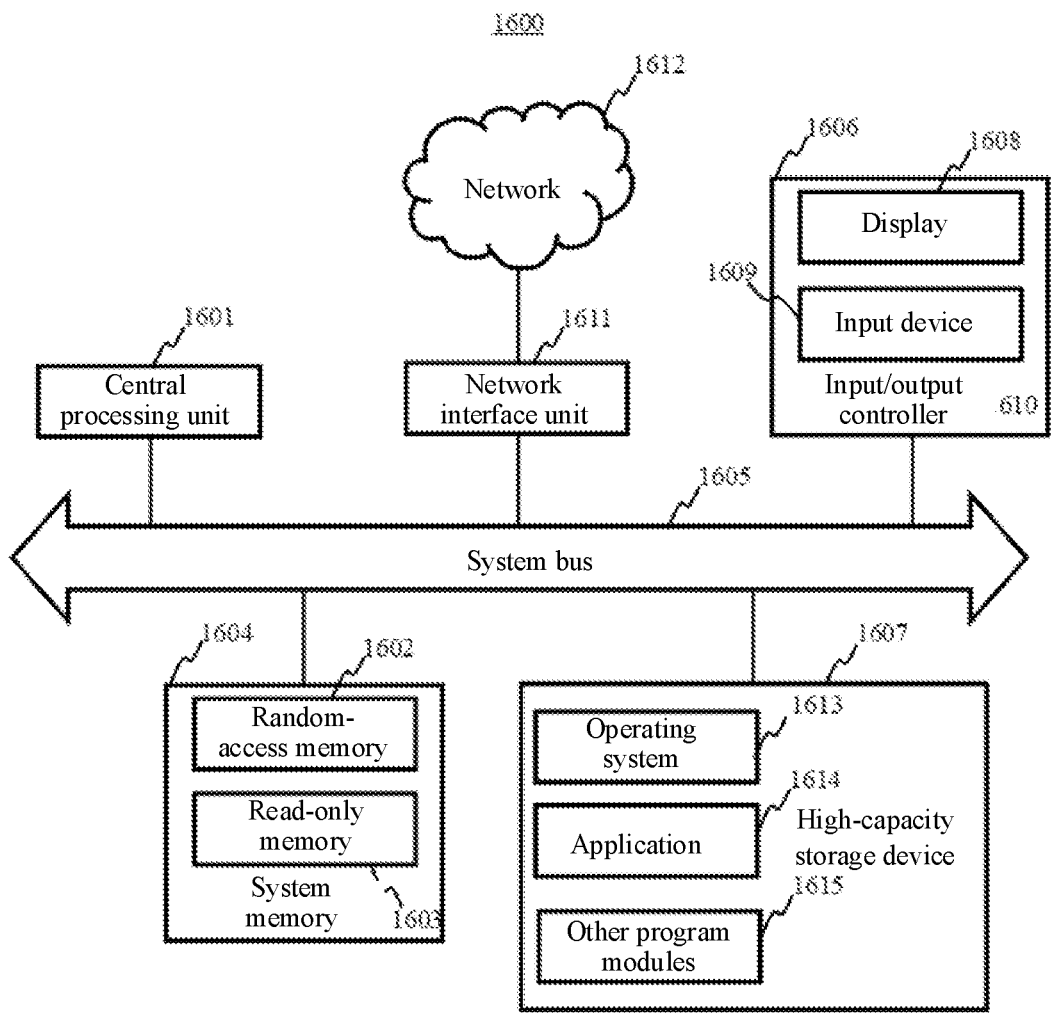
FIG. 13 is a schematic structural diagram of a server according to an embodiment of the present disclosure.

FIG. 13 is a schematic structural diagram of a server 1600 according to an embodiment of the present disclosure. The server 1600 includes a central processing unit (CPU) 1601, a system memory 1604 including a random-access memory (RAM) 1602 and a read-only memory (ROM) 1603, and a system bus 1605 connecting the system memory 1604 and the CPU 1601. The server 1600 further includes a basic input/output system (I/O system) 1606 which helps transmit information between various components in the computer, and a high-capacity storage device 1607 for storing an operating system 1613, an application 1614, and other program modules 1615.

The basic I/O system 1606 includes a display 1608 for displaying the information and an input device 1609, such as a mouse and a keyboard, for the user to input information. The display 1608 and the input device 1609 are both connected to the CPU 1601 via an input/output controller 1610 that is connected to the system bus 1605. The basic I/O system 1606 may further include an input/output controller 1610 for receiving and processing the input from a plurality of other devices, such as a keyboard, a mouse, and an electronic stylus. Similarly, the input/output controller 1610 further provides output to a display screen, a printer or other types of output devices.

The high-capacity storage device 1607 is connected to the CPU 1601 by a high-capacity storage controller (not shown) connected to the system bus 1605. The high-capacity storage device 1607 and a computer-readable medium associated therewith provide non-volatile storage for the server 1600. That is, the high-capacity storage device 1607 may include a computer-readable medium (not shown), such as a hard disk and a compact disc read-only memory (CD-ROM) drive.

Generally, the computer non-transitory readable medium may include a computer storage medium and a communication medium. The computer storage medium includes volatile and non-volatile, removable and non-removable media implemented in any method or technology for storage of information such as a computer-readable instruction, a data structure, a program module or other data. The computer storage medium includes an RAM, an ROM, an erasable programmable read-only memory (EPROM), an electrically erasable programmable read-only memory (EEPROM), a flash memory and other solid-state storage media, a CD-ROM, a digital versatile disc (DVD) and other optical storage, and a tape cartridge, a magnetic tape, a disk storage or other magnetic storage devices. Certainly, a person skilled in the art knows that the computer storage medium is not limited to above. The above system memory 1604 and the high-capacity storage device 1607 may be collectively referred to as the memory.

According to the various embodiments of the present disclosure, the server 1600 may also be connected to a remote computer on a network through the network, such as the Internet, for operation. That is, the server 1600 may be connected to the network 1612 through a network interface unit 1611 connected to the system bus 1605, or may be connected to other types of networks or remote computer systems (not shown) through the network interface unit 1611.

The memory further includes one or more programs stored in the memory. The CPU 1601 performs any one of the methods for detecting obstacles according to the above embodiments by running the one or more programs.

In addition, an embodiment of the present disclosure further provides a device for detecting obstacles. The device includes a processor and a memory, wherein the memory stores at least one instruction, at least one program, code set, or instruction set, and the processor, when loading and executing the at least one instruction, the at least one program, the code set, or the instruction set, is caused to perform any of the methods for detecting obstacles according to the above embodiments.

In addition, an embodiment of the present disclosure further provides a computer storage medium storing at least one instruction, at least one program, a code set, or an instruction set, and a processor, when loading and executing the at least one instruction, the at least one program, the code set, or the instruction set, is caused to perform any of the methods for detecting obstacles according to the above embodiments.

In the present disclosure, the terms such as "first" and "second" are merely for a descriptive purpose, and cannot be understood as indicating or implying a relative importance. The term "a plurality of" means two or more in number, unless otherwise stated.

In the several examples provided in the present disclosure, it should be understood that, the disclosed apparatus and method may be implemented in other ways. For example, the apparatus examples described above are only illustrative. For example, the above division of the units, which is only a logical function division, can be actually implemented in other fashions, for example, a plurality of units or components may be combined or may be integrated into another system, or some features may be ignored or not be implemented. In addition, the shown or discussed mutual coupling, direct coupling or communication connection may be indirect coupling or communication connection through some interfaces, devices or units, and may also be in an electrical form or in other forms.

The units described above as separate components may or may not be physically separated, and the components shown as units may or may not be physical units, that is, the units may be located in one place, or the units may be distributed on a plurality of network units. Some or all of the units may be selected based on actual needs to achieve the purpose of the solution of the embodiments.

Those skilled in the art can understand that all or part of the steps in the above embodiments may be implemented by hardware, or by a program to instruct related hardware. The program may be stored in a computer-readable storage medium. The above storage medium may be a read-only memory, a magnetic disk or an optical disk and the like.

Described above are merely optional embodiments of the present disclosure, and are not intended to limit the present disclosure. Within the spirit and principles of the disclosure, any modifications, equivalent substitutions, improvements, and the like are within the protection scope of the present disclosure.

What is claimed is:

1. A method for detecting obstacles, comprising:
acquiring a monitored image of a monitored region;
performing object detection on the monitored image;
performing pedestrian detection on the monitored image;
in response to acquiring an object identification group comprising at least one object identification box by the object detection, and acquiring at least one pedestrian identification box by the pedestrian detection, acquiring a to-be-determined object identification group by removing an object identification box in the object identification group associated with the at least one pedestrian identification box, wherein the object identification box comprises an image of an object in the monitored image, and the pedestrian identification box comprises an image of a pedestrian in the monitored image; and
in response to determining that an object identification box is present in the to-be-determined object identification group, determining that an obstacle is present in the monitored region; and
wherein performing the object detection on the monitored image comprises:
acquiring a pixel difference image between the monitored image and a target template image in a template group, wherein a pixel value of a pixel point at a first position in the pixel difference image is a target difference value, the target difference value is an absolute value of a difference value between a pixel value of a pixel point at the first position in the monitored image and a pixel value of a pixel point at the first position in the target template image, the template group comprises at least two template images of the monitored region without obstacles or pedestrians under different lighting conditions, or the template group comprises one template image of the monitored region without obstacles or pedestrians, and the target template image is a template image in the template group, which has the smallest difference from the monitored image;

acquiring a binarized image by binarizing the pixel difference image;

performing connected component analysis on the binarized image;

in response to acquiring at least one connected component by the connected component analysis, determining whether a connected component with an area greater than a first threshold is present in the at least one connected component; and in response to determining that a connected component with an area greater than the first threshold is present, acquiring a circumscribed graph of the connected component with the area greater than the first threshold, wherein the circumscribed graph is the object identification box.

2. The method according to claim 1, wherein prior to acquiring the to-be-determined object identification group by removing the object identification box in the object identification group associated with the at least one pedestrian identification box, the method comprises:

determining whether an object identification box overlapped with the at least one pedestrian identification box is present in the object identification group; and in response to determining that a first object identification box overlapped with a first pedestrian identification box among the at least one pedestrian identification box is present, determining the first object identification box as the object identification box associated with the first pedestrian identification box.

3. The method according to claim 1, wherein prior to acquiring the to-be-determined object identification group by removing the object identification box in the object identification group associated with the at least one pedestrian identification box, the method comprises:

determining whether an object identification box overlapped with the at least one pedestrian identification box is present in the object identification group; and in response to determining that a first object identification box overlapped with a first pedestrian identification box among the at least one pedestrian identification box is present, determining whether the first object identification box is within a range of the first pedestrian identification box in a first direction, wherein the first direction is a height direction of the pedestrian in the first pedestrian identification box; and in response to determining that the first object identification box is within the range of the first pedestrian identification box in the first direction, determining the first object identification box as the object identification box associated with the first pedestrian identification box.

4. The method according to claim 1, wherein in response to determining that the object identification box is present in the to-be-determined object identification group, upon determining that the obstacle is present in the monitored region, the method further comprises:

acquiring a target position of a target region in the monitored region in the monitored image;

determining whether an object identification box overlapped with the target position is present in the to-be-determined object identification group; and in response to determining that the object identification box overlapped with the target position is present, determining that an obstacle is present in the target region.

5. The method according to claim 4, wherein in response to determining that the object identification box overlapped with the target position is present, upon determining that the obstacle is present in the target region, the method further comprises:

issuing an obstacle notice;

suspending the object detection and the pedestrian detection that are performed on the monitored image; and upon receipt of an instruction that the obstacle is cleared in response to the obstacle notice, resuming the object detection and the pedestrian detection on the monitored image, and performing the step of acquiring the to-be-determined object identification group by removing the object identification box in the object identification group associated with the at least one pedestrian identification box.

6. The method according to claim 4, wherein an edge of a specified color is present at the target position, and acquiring the target position of the target region in the monitored region in the monitored image comprises:

determining the target position of the target region in the monitored image by image recognition.

7. The method according to claim 1, wherein acquiring the monitored image of the monitored region comprises:

acquiring a video data stream from a streaming media server;

storing the video data stream in a data buffer; and acquiring the monitored image of the monitored region from the data buffer.

8. A device for detecting obstacles, comprising a processor and a memory, wherein the memory stores at least one instruction, at least one program, code set, or instruction set, and the processor, when loading and executing the at least one instruction, the at least one program, the code set, or the instruction set, is caused to perform a method for detecting obstacles, the method comprising:

acquiring a monitored image of a monitored region;

performing object detection on the monitored image;

performing pedestrian detection on the monitored image;

in response to acquiring an object identification group comprising at least one object identification box by the object detection, and acquiring at least one pedestrian identification box by the pedestrian detection, acquiring a to-be-determined object identification group by removing an object identification box in the object identification group associated with the at least one pedestrian identification box, wherein the object identification box comprises an image of an object in the monitored image, and the pedestrian identification box comprises an image of a pedestrian in the monitored image; and in response to determining that an object identification box is present in the to-be-determined object identification group, determining that an obstacle is present in the monitored region; and wherein performing the object detection on the monitored image comprises:

acquiring a pixel difference image between the monitored image and a target template image in a template group, wherein a pixel value of a pixel point at a first position in the pixel difference image is a target difference value, the target difference value is an absolute value of a difference value between a pixel value of a pixel point at the first position in the monitored image and a pixel value of a pixel point at the first position in the target template image, the template group comprises at least two template images of the monitored region without obstacles or pedestrians under different lighting conditions, or the template group comprises one template image of the monitored region without obstacles or pedestrians, and the target template image is a template image in the template group, which has the smallest difference from the monitored image;

acquiring a binarized image by binarizing the pixel difference image;

performing connected component analysis on the binarized image;

in response to acquiring at least one connected component by the connected component analysis, determining whether a connected component with an area greater than a first threshold is present in the at least one connected component; and in response to determining that a connected component with an area greater than the first threshold is present, acquiring a circumscribed graph of the connected component with the area greater than the first threshold, wherein the circumscribed graph is the object identification box.

9. The device according to claim 8, wherein prior to acquiring the to-be-determined object identification group by removing the object identification box in the object identification group associated with the at least one pedestrian identification box, the method comprises:

determining whether an object identification box overlapped with the at least one pedestrian identification box is present in the object identification group; and in response to determining that a first object identification box overlapped with a first pedestrian identification box among the at least one pedestrian identification box is present, determining the first object identification box as the object identification box associated with the first pedestrian identification box.

10. The device according to claim 8, wherein prior to acquiring the to-be-determined object identification group by removing the object identification box in the object identification group associated with the at least one pedestrian identification box, the method comprises:

determining whether an object identification box overlapped with the at least one pedestrian identification box is present in the object identification group; and in response to determining that a first object identification box overlapped with a first pedestrian identification box among the at least one pedestrian identification box is present, determining whether the first object identification box is within a range of the first pedestrian identification box in a first direction, wherein the first direction is a height direction of the pedestrian in the first pedestrian identification box; and in response to determining that the first object identification box is within the range of the first pedestrian identification box in the first direction, determining the first object identification box as the object identification box associated with the first pedestrian identification box.

11. The device according to claim 8, wherein in response to determining that the object identification box is present in the to-be-determined object identification group, upon determining that the obstacle is present in the monitored region, the method further comprises:

acquiring a target position of a target region in the monitored region in the monitored image;

determining whether an object identification box overlapped with the target position is present in the to-be-determined object identification group; and in response to determining that the object identification box overlapped with the target position is present, determining that an obstacle is present in the target region.

12. The device according to claim 11, wherein in response to determining that the object identification box overlapped with the target position is present, upon determining that the obstacle is present in the target region, the method further comprises:

issuing an obstacle notice;

suspending the object detection and the pedestrian detection that are performed on the monitored image; and upon receipt of an instruction that the obstacle is cleared in response to the obstacle notice, resuming the object detection and the pedestrian detection on the monitored image, and performing the step of acquiring the to-be-determined object identification group by removing the object identification box in the object identification group associated with the at least one pedestrian identification box.

13. The device according to claim 11, wherein an edge of a specified color is present at the target position, and acquiring the target position of the target region in the monitored region in the monitored image comprises:

determining the target position of the target region in the monitored image by image recognition.

14. The device according to claim 8, wherein acquiring the monitored image of the monitored region comprises:

acquiring a video data stream from a streaming media server;

storing the video data stream in a data buffer; and acquiring the monitored image of the monitored region from the data buffer.

15. A non-volatile computer storage medium storing at least one instruction, at least one program, code set, or instruction set, and a processor, when loading and executing the at least one instruction, the at least one program, the code set, or the instruction set, is caused to perform a method for detecting obstacles, the method comprising:

acquiring a monitored image of a monitored region;

performing object detection on the monitored image;

performing pedestrian detection on the monitored image;

in response to acquiring an object identification group comprising at least one object identification box by the object detection, and acquiring at least one pedestrian identification box by the pedestrian detection, acquiring a to-be-determined object identification group by removing an object identification box in the object identification group associated with the at least one pedestrian identification box, wherein the object identification box comprises an image of an object in the monitored image, and the pedestrian identification box comprises an image of a pedestrian in the monitored image; and in response to determining that an object identification box is present in the to-be-determined object identification group, determining that an obstacle is present in the monitored region; and wherein performing the object detection on the monitored image comprises:

acquiring a pixel difference image between the monitored image and a target template image in a template group, wherein a pixel value of a pixel point at a first position in the pixel difference image is a target difference value, the target difference value is an absolute value of a difference value between a pixel value of a pixel point at the first position in the monitored image and a pixel value of a pixel point at the first position in the target template image, the template group comprises at least two template images of the monitored region without obstacles or pedestrians under different lighting conditions, or the template group comprises one template image of the monitored region without obstacles or pedestrians, and the target template image is a template image in the template group, which has the smallest difference from the monitored image;

acquiring a binarized image by binarizing the pixel difference image;

performing connected component analysis on the binarized image;

in response to acquiring at least one connected component by the connected component analysis, determining whether a connected component with an area greater than a first threshold is present in the at least one connected component; and in response to determining that a connected component with an area greater than the first threshold is present, acquiring a circumscribed graph of the connected component with the area greater than the first threshold, wherein the circumscribed graph is the object identification box.

16. The non-volatile computer storage medium according to claim 15, wherein prior to acquiring the to-be-determined object identification group by removing the object identification box in the object identification group associated with the at least one pedestrian identification box, the method comprises:

determining whether an object identification box overlapped with the at least one pedestrian identification box is present in the object identification group; and in response to determining that a first object identification box overlapped with a first pedestrian identification box among the at least one pedestrian identification box is present, determining the first object identification box as the object identification box associated with the first pedestrian identification box.

17. The non-volatile computer storage medium according to claim 15, wherein prior to acquiring the to-be-determined object identification group by removing the object identification box in the object identification group associated with the at least one pedestrian identification box, the method comprises:

determining whether an object identification box overlapped with the at least one pedestrian identification box is present in the object identification group; and in response to determining that a first object identification box overlapped with a first pedestrian identification box among the at least one pedestrian identification box is present, determining whether the first object identification box is within a range of the first pedestrian identification box in a first direction, wherein the first direction is a height direction of the pedestrian in the first pedestrian identification box; and in response to determining that the first object identification box is within the range of the first pedestrian identification box in the first direction, determining the first object identification box as the object identification box associated with the first pedestrian identification box.

* * * * *